Patented Oct. 6, 1931

1,825,802

UNITED STATES PATENT OFFICE

GEORG KRÄNZLEIN AND ARTHUR VOSS, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY

TANNING SUBSTANCE AND PROCESS OF PREPARING SAME

No Drawing. Application filed February 7, 1924, Serial No. 691,274, and in Germany February 7, 1923.

We have found that the resinous condensation products obtained in the usual manner from phenols and their homologues in the form of their alkali metal salts enter easily into reaction with aralkylhalogenidesulphonic acids as for instance benzylchloride sulphonic acids and, in general with sulphonic acids containing exchangeable halogen. It is a surprising fact that thereby sulphonic acids are produced which are very readily soluble in water and which behave towards animal fiber like genuine tanning substances. The new tanning-substances are distinguished by their particularly valuable properties, which have not heretofore been observed with synthetic tanning-substances. They behave like vegetable extracts and yield soft and full-bodied leathers which resemble the leathers produced with the aid of mimosa. The tanning effect is so excellent that the new products permit the saving of certain manipulations during the working up of the leather. An important property of the new tanning substances is the fact that they can be used quite alone, that is to say, without simultaneously using any additional substances. The extraordinary results obtainable with the new tanning substances as compared with those obtainable with other known synthetic products are evidently due to the presence of the external sulphonic groups.

Analogous bodies are obtained by condensing sulphobenzyl ethers with aldehydes. The sulphobenzylethers may be prepared by condensing phenols and cresols or the like with sulphonic acids containing exchangeable halogen, for instance benzylchloridesulphonic acids. Sometimes it is advantageous to conduct the reaction under pressure. The sulphonic acids made use of in the above reactions may be characterized as compounds which contain the atom grouping

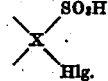

in which Hlg. stands for a replaceable halogen and X stands for a carbon atom or a chain of carbon atoms. Amongst the aromatic series there have proved to be suitable for instance nitrochlorobenzenesulphonic acid and sulphochlorobenzoic acid, and amongst the aliphatic series for instance chlorethanesulphonic acid.

Water-soluble condensation products possessing excellent tanning-properties are also obtained by causing the components to act upon each other in presence or absence of catalytic substances such as zinc chloride and aluminium chloride. It appears that the aralkylhalogenidesulphonic acids including the corresponding sulphochlorides are not only capable of being condensed with already formed bodies of a phenolic or resinous character, but that they may be combined in general with the aromatic hydrocarbons of which such bodies of high molecular weight are composed, for instance naphthalene, phenanthrene, carbazol and their homologues and derivatives or also with the resinous condensation products derived therefrom, so as to form water-soluble compounds possessing good tanning properties, the sulphonic acids showing in this case also a condensing action.

Finally the aralkylhalogenidesulphonic acids or their chlorides are also capable of yielding water-soluble glue-precipitating condensation products suitable for tanning animal skins by internal condensation that is to say without addition of a second component.

The following examples illustrate our invention:

1. 115 parts of sodium p-benzylchloridesulphonate are dissolved in 400 parts of water and the solution is slowly introduced at 40–50° C. into a solution of 60 parts of the resinous condensation product obtained from technical cresol and paraldehyde in 65 parts of concentrated caustic soda solution (40° Bé.) and about 100–150 parts of water. After all ingredients have been added, the clear solution of alkaline reaction is kept boiling for a short time. At the end the reaction mixture is still somewhat alkaline. The solution is neutralized by adding some acetic acid or diluted sulphuric acid. It is then best evaporated in vacuo to a liquid of a syrupy consistency, which after being slightly acidified and a determination of its tanning capacity, can be directly used for tanning purposes.

To 100 parts of the skin so much tanning solution diluted with water is applied as corresponds to 23–25 parts of tanning substance, the solution being added in increasing portions to the scouring-vat over a period of 16 hours. After 20–24 hours, the tanning process is complete. The leathers are then rinsed, stretched out and dried. They are very light, full and soft and resemble in every respect the leathers tanned with the aid of vegetable extracts.

2. 150 parts of the phenoxysulphobenzylether obtained by reacting on a mixture of sodium o- and p-benzylchloridesulphonate with so-called washed carbolic acid, i. e. with a mixture of phenol, cresol and higher homologues, are mixed with 65 parts of formaldehyde of 30%, 300 parts of water and 30 parts of hydrochloric acid; the solution is then boiled for several hours in a reflux apparatus, the undissolved portion is filtered off, the filtrate neutralized by adding an alkali and then worked up in the manner indicated in Example 1.

By evaporating, a syrupy mass is obtained which, after it has been slightly acidified and its content of tanning principle ascertained, can be directly used for tanning purposes.

The tanning process is carried out according to the same prescription as given in Example 1. The leathers so obtained are similar as regards their properties to those above described.

3. 120 parts of a mixture of xylolsulphochlorides, produced by treating commercial xylene with chlorosulphonic acid, are converted into a mixture of the corresponding methylated benzylchloridesulphochlorides by the introduction of chlorine. After saponification and transformation into an aqueous solution of the alkali compound of the tolychloridesulphonic acids the said solution is converted into the benzylethersulphonic acid of the tetrahydronaphthol by treatment with an alkaline solution of $\beta$-tetrahydronaphthol. The benzylethersulphonic acid of the tetrahydronaphthol is isolated by acidifying and shows tanning properties. The body thus obtained is mixed with 400 parts of water and 40 parts of formaldehyde (30%) and the resulting mixture is boiled, while adding 10–12 parts of concentrated hydrochloric acid, until the aldehyde has disappeared for the most part, and a sample of the solution shows strong precipitating action upon a solution of gelatine. The resulting solution may, just as well as that prepared according to the foregoing example, be directly used for tanning purposes and the tanning substance may also be concentrated by evaporation and separation of its inorganic components.

4. 130 parts of 2-chlorotoluene-4-sulphochloride are transformed by introducing the calculated quantity of chlorine to the 2-chlorobenzylchloridesulphochloride and this latter by saponification and neutralization with caustic soda solution into the sodium salt of the sulphonic acid. By treating its aqueous solution with an alkaline solution of the resinous condensation product of $\alpha$-naphthol and paraldehyde, a valuable tanning substance is obtained.

5. By introducing slowly at 0–5° C. while stirring and externally cooling 65 parts of sulphur chloride—preferably in a solution in benzene or chloroform—into 50 parts of commercial cresol, gradually raising the temperature after all ingredients are introduced and the evolution of hydrogen chloride has diminished, and finally evaporating the solvent completely, a soft honey-colored mass is obtained. This mass is liberated from any unaltered cresol by steam distillation and then dissolved while warm in 65 parts of concentrated caustic soda solution and 150 parts of water. Whereupon an aqueous solution of 70 parts of sodium benzalchloridesulphonate is introduced at 70–90° C. into the alkaline solution of the resin. After the reaction is complete, the mixture is acidified. By means of the solution of tanning substance so obtained, skins can be converted into a valuable leather.

6. 120 parts of the product obtained by condensing resorcin with benzaldehyde, are dissolved in 500 parts of water and 50 parts of caustic soda solution. To this solution are added at ordinary temperature 60 parts of sodium p-benzylchloridesulphonate. The mass is heated for about 10–20 minutes to 80° C. The making up of the product into the finished tanning substance is operated in the manner described in the preceding examples. The leathers obtainable by this substance stand comparison with the best-quality leathers obtainable by means of vegetable tanning substances.

7. 100 parts of the resinous condensation product obtained by the action of zinc chloride upon resorcin, are dissolved in 60 parts of caustic soda solution (40° Bé.) and 200 parts of water, and heated to 100° C.; into this boiling solution a solution of 80 parts of sodium benzylchloridesulphonate in water is run. After the reaction is complete, the product is worked up as indicated in the preceding examples. Thus a tanning substance possessing very valuable properties is obtained. It is distinguished from other tanning substances above all by the fact that, when using it, the complete tanning process takes a very quick course.

8. 70 parts of the resinous condensation product—produced by the action of sulphur chloride upon phenol—are dissolved in 200 parts of water and 65 parts of caustic soda solution (40° Bé.), the solution is mixed with 120 parts of sodium o-nitro-p-chlorobenzenesulphonate and the mass is heated, under pressure, for 2 hours to 130–140° C. The product of the reaction is then dissolved in the required quantity of hot water and the solution is slightly acidified. It can be directly used for tanning purposes. The leathers obtained in this case are of yellow color. By reducing the nitro group, the corresponding amino compound is obtained which constitutes a particularly valuable tanning substance.

9. 55 parts of the resinous product obtained by condensing phenol with formaldehyde are dissolved in 60 parts of concentrated caustic soda solution (40° Bé.) and 200 parts of water. In the same manner are dissolved 190 parts of 2.4-chlorosulphobenzoic acid in the required quantity of hot water; the solutions are mixed and boiled while cooling in the reflux apparatus until a test sample when acidified no longer shows a remarkable turbidity. The hot solution is slightly acidified with acetic acid and separated by filtration from slight quantities of flocculent matter. The solution so obtained can be directly used for tanning purposes. The leathers obtained by means of this solution are full-bodied soft and very light-colored.

10. 175 parts of sulphoethylether produced by the action of sodium 1-chlorethanesulphonate upon β-tetrahydro naphthol, are dissolved in a sufficient quantity of water (400–600 parts), this solution is mixed with 60 parts of formaldehyde 30% and 30 parts of concentrated hydrochloric acid and kept boiling, while cooling in the reflux apparatus, until the aldehyde has for the most part disappeared and the test sample shows a strong precipitation of gelatine.

11. 60 parts of naphthalene are mixed with 100 parts of p-benzylchloridesulphochloride, there are then added 4 parts of zinc chloride and the mass is gradually heated to 100–120° C. A lively evolution of hydrogen chloride sets in, which, if necessary, is abated by removing the flame. After the reaction has subsided, the temperature is still kept at 120° C. for a short time; the unaltered naphthalene is expelled by steam distillation, the residue is mixed with a quantity of sodium carbonate necessary for the precipitation of the zinc, then boiled up and filtered. Thereupon the solution is neutralized or slightly acidified and evaporated, preferably in vacuo. There remains a light-brown, tough resin-cake which readily dissolves in water. By means of a solution of this product animal hides can be made into a valuable leather which is soft to the touch and has a firm grain.

12. 75 parts of carbazol are mixed with 100 parts of o-benzylchloridesulphonic acid and 10 parts of aluminium chloride and the mass is heated for 2 hours to 140°. After cooling, the reaction-mass is dissolved with 400 parts of hot water, filtered from the undissolved part and the filtrate is evaporated. There remains a solid cake which easily dissolves in water and which when used in a suitable manner for treating animal skins converts the latter into a soft and full-bodied leather.

13. 85 parts of anthracene residues as they are obtained in the purification of anthracene, are mixed with 110 parts of p-benzylchloridesulphochloride and 10 parts of aluminium chloride and the mass is heated, while continually stirring, to a temperature of a little over 100° C. until the lively evolution of hydrogen chloride diminishes. After cooling, the mass, is dissolved in a copious quantity of hot water, boiled up with the latter and otherwise worked up as indicated in Example 12. Thus, a water-soluble product is obtained which can be directly used for tanning-purposes.

14. 50 parts of commercial cresol (a mixture of the three isomerides) are mixed with 125 parts of o-chloro-p-benzylchloridesulphonic acid, this mixture is then cautiously heated until the evolution of hydrogen chloride sets in. The mass is kept at this temperature, advantageously while stirring, and only gradually the temperature is raised, finally to 140–150° C. After the reaction is complete and a test sample dissolves well in water, the unaltered cresol is expelled with direct water-vapor and the residue worked up as indicated in the preceding examples. Thus a resinous product is obtained which is readily soluble in water and of a brownish-yellow color and which when used for treating animal skins converts the latter into an excellent leather.

15. 80 parts of "coumaron resin" are mixed with 20 parts of concentrated sulphuric acid and into the mass are gradually introduced, while stirring at 50–60° C., 140 g. of p-benzylchloridesulphonic acid. A rather lively effervescence occurs with evolution of hydrogen chloride. After this has abated, the mass is again heated and the temperature kept at about 80–90° C. until a test sample dissolves in water leaving only a small residue. The reaction mass is diluted with water, filtered while hot and, after adding so much alkali as is necessary for the neutralization of the free sulphuric acid and, if required, also of a part of the resinosulphonic acid it is brought by evaporation to the necessary concentration. By treating animal skins with the tanning substance thus produced, a light-colored full-bodied leather is obtained.

16. 100 parts of p-benzylchloridesulphochloride are mixed with 2 gr. of zinc chloride and, while stirring, the mass is heated to about 100° C. After the evolution of hydrogen chloride, which is at the beginning rather lively, has diminished, the temperature is raised and finally kept for about ½–1 hour at 130–135° C. After the temperature has gone down to about 105° C., 18 parts of water are slowly and by portions added and the fusion is kept slightly boiling at this temperature until a test sample dissolves in water without leaving a remarkable residue. Thereupon the mass is diluted in three times its quantity of water, and filtered, whereupon it can be used either directly or after partial neutralization of the free sulphonic acid for tanning purposes. Instead of the zinc chloride any other catalyzer may be employed.

17. 120 parts of a mixture of o- and p-toluenesulphochloride chlorinated in the methyl residue, (the chlorination was carried on until the introduction of 2 atoms of chlorine) are mixed with 5 gr. phosphorous pentachloride and the mass is gradually heated while stirring. Accordingly as the evolution of hydrogen chloride decreases, the temperature is raised and after condensation the transformation product is saponified in the manner indicated in Example 16. Thus a tanning substance is obtained which has a very quick tanning action and gives a leather of very good properties.

18. 120 parts of sodiumbenzylchloridesulphonate are finely pulverized and introduced at about 40° C. while stirring into a solution of 70 parts of the resinous product obtained by condensing phenol and aldol in 65 parts of concentrated caustic soda solution (40°) and 150 parts of water and after all ingredients are introduced, the temperature is raised to 80° C. When a test sample, after being diluted with water and acidified, remains clear, the reaction is complete. After the product is brought to the necessary acidity and dilution, it can be directly used for tanning animal skins.

The structural formulæ of the compounds and the course of the reactions involved in the preparation of the compounds in accordance with the foregoing examples are supposed to be as follows:

*Example 1*

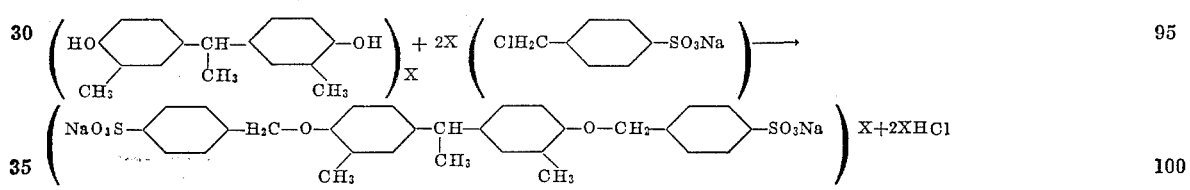

*Example 2*

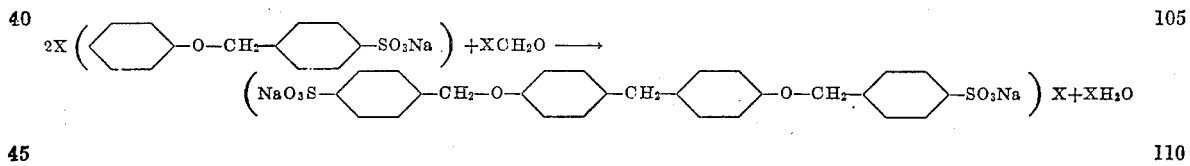

*Example 3*

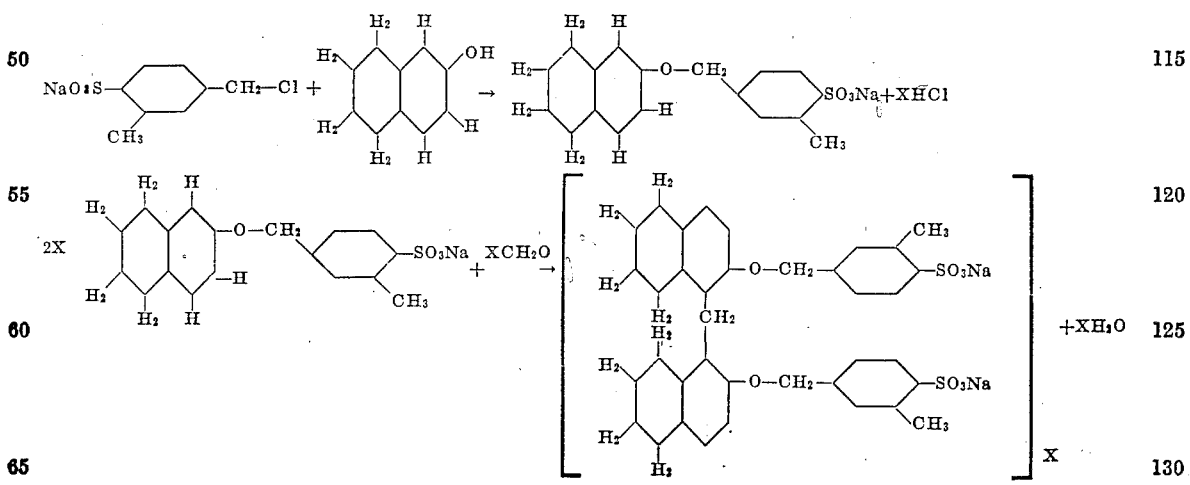

Example 4
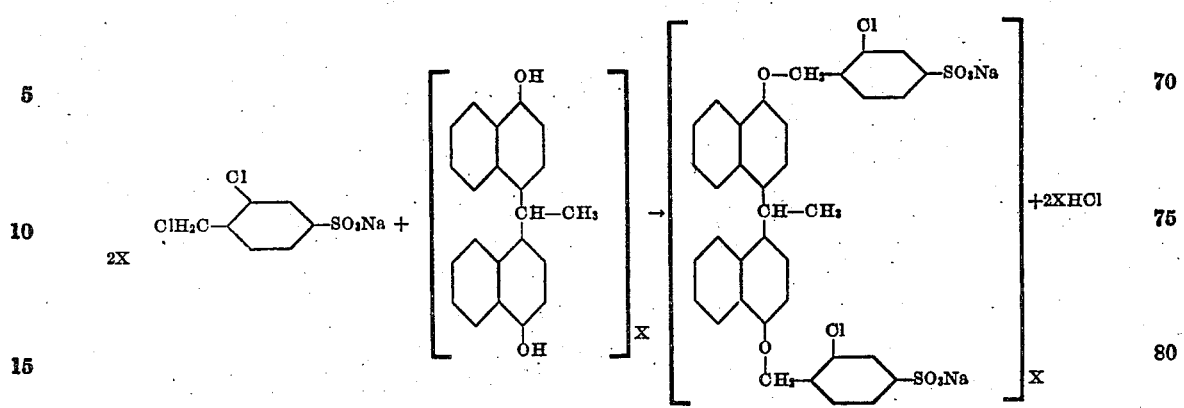
Example 5
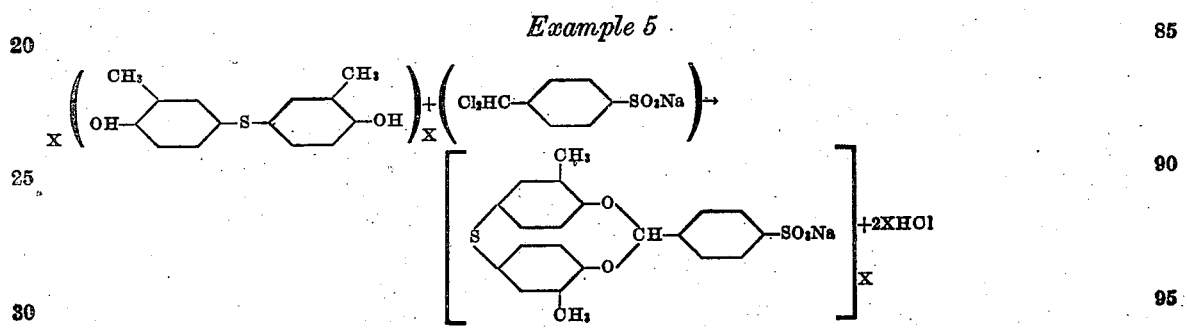
Example 8
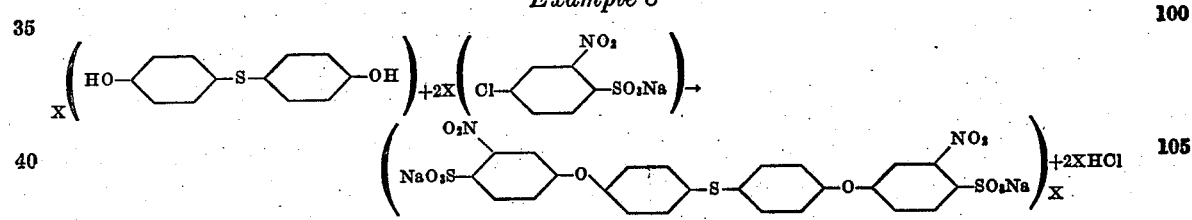
Example 9
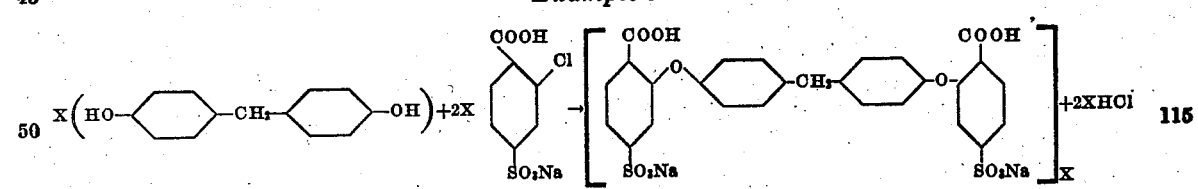
Example 10
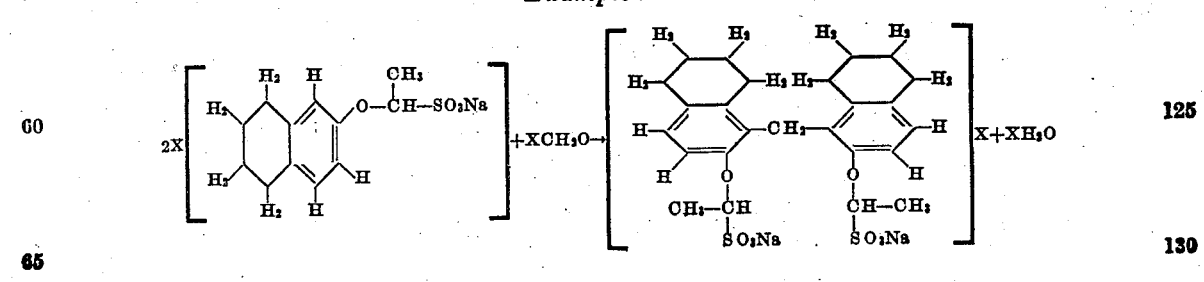

*Example 11*

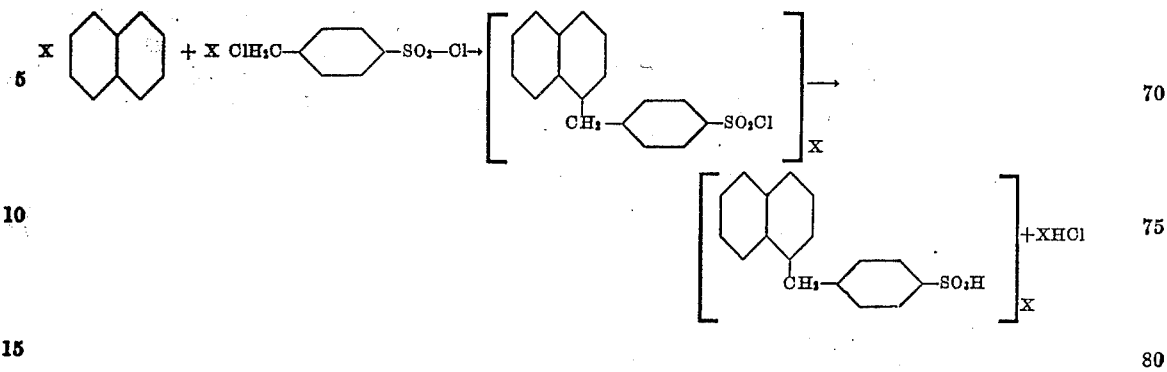

*Example 14*

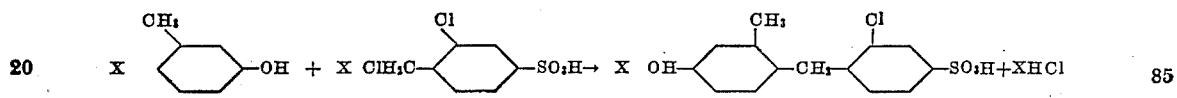

*Example 16*

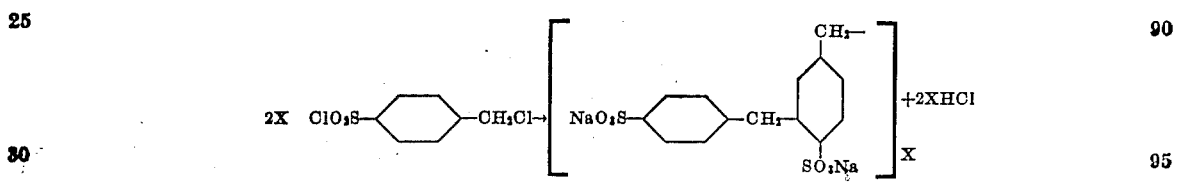

Having now described our invention, what we claim is:

1. Process of preparing tanning substances which comprises reacting an organic compound containing the atom grouping:

wherein Hlg stands for a replaceable halogen, Y for hydrogen or a salt-forming residue, and X for a chain of two or more carbon atoms, with an alkali-soluble condensation product of a phenol and a compound of the group consisting of aldehydes, phenols and sulfur chloride in the presence of water and an alkaline agent which is capable of dissolving the phenol condensation product.

2. Process of preparing tanning substances which comprises reacting an organic compound containing the atom grouping:

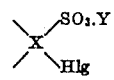

wherein Hlg stands for a replaceable halogen, Y for hydrogen or a salt-forming residue, and X for a chain of two or more carbon atoms, with an alkali-soluble phenol-aldehyde condensation product in the presence of water and an alkaline agent which is capable of dissolving the phenol-aldehyde condensation product.

3. Process of preparing tanning substances which comprises reacting an organic compound containing the atom grouping:

wherein Hlg stands for a replaceable halogen, Y for hydrogen or a salt-forming residue, and X for a chain of two or more carbon atoms, with an alkali-soluble cresol-aldehyde condensation product in the presence of water and an alkaline agent which is capable of dissolving the cresol-aldehyde condensation product.

4. Process of preparing tanning substances which comprises reacting a sodium benzyl-chloride sulfonate with an alkali-soluble phenol-aldehyde condensation product in the presence of water and an alkaline agent which is capable of dissolving the phenol-aldehyde condensation product.

5. Process of preparing tanning substances which comprises reacting a sodium benzyl-chloride sulfonate with an alkali-soluble cresol-aldehyde condensation product in the presence of water and an alkaline agent which is capable of dissolving the cresol-aldehyde condensation product.

6. Process of preparing tanning substances which comprises reacting a sodium p-benzylchloride sulfonate with an alkali-soluble phenol-aldehyde condensation product in the presence of water and an alkaline agent which is capable of dissolving the phenol-aldehyde condensation product.

7. Process of preparing tanning substances which comprises reacting a sodium p-benzylchloride sulfonate with an alkali-soluble cresol-aldehyde condensation product in the presence of water and an alkaline agent which is capable of dissolving the cresol-aldehyde condensation product.

8. As new products the tanning substances obtainable by reacting an organic compound containing the atom grouping:

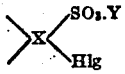

wherein Hlg stands for a replaceable halogen, Y for hydrogen or a salt-forming residue, and X for a chain of two or more carbon atoms, with an alkali-soluble condensation product of a phenol and a compound of the group consisting of aldehydes, phenols and sulfur chloride in the presence of water and an alkaline agent which is capable of dissolving the phenol condensation product, said products forming homogeneous brownish colored solutions of syrupy consistency, being easily soluble in water and alkalies, precipitating gelatine from its solution and giving characteristic colorations with ferric salts.

9. As new products, the tanning substances obtainable by reacting an organic compound containing the atom grouping:

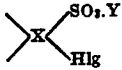

wherein Hlg stands for a replaceable halogen, Y for hydrogen or a salt-forming residue, and X for a chain of two or more carbon atoms, with an alkali-soluble phenol-aldehyde condensation product in the presence of water and an alkaline agent which is capable of dissolving the phenol-aldehyde condensation product, said products forming homogeneous brownish colored solutions of syrupy consistency, being easily soluble in water and alkalies, precipitating gelatine from its solution and giving characteristic colorations with ferric salts.

10. As new products the tanning substances obtainable by reacting an organic compound containing the atom grouping:

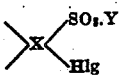

wherein Hlg stands for a replaceable halogen, Y for hydrogen or a salt-forming residue, and X for a chain of two or more carbon atoms, with an alkali-soluble cresol-aldehyde condensation product in the presence of water and an alkaline agent which is capable of dissolving the cresol-aldehyde condensation product, said products forming homogeneous brownish colored solutions of syrupy consistency, being easily soluble in water and alkalies, precipitating gelatine from its solution and giving characteristic colorations with ferric salts.

11. As new products the tanning substances obtainable by reacting a sodium benzylchloride sulfonate with an alkali-soluble phenol-aldehyde condensation product in the presence of water and an alkaline agent which is capable of dissolving the phenol-aldehyde condensation product, said products forming homogeneous brownish colored solutions of syrupy consistency, being easily soluble in water and alkalies, precipitating gelatine from its solution and giving characteristic colorations with ferric salts.

12. As new products the tanning substances obtainable by reacting a sodium benzylchloride sulfonate with an alkali-soluble cresol-aldehyde condensation product in the presence of water and an alkaline agent which is capable of dissolving the cresol-aldehyde condensation product, said products forming homogeneous brownish colored solutions of syrupy consistency, being easily soluble in water and alkalies, precipitating gelatine from its solution and giving characteristic colorations with ferric salts.

13. As new products the tanning substances obtainable by reacting a sodium p-benzylchloride sulfonate with an alkali-soluble phenol-aldehyde condensation product in the presence of water and an alkaline agent which is capable of dissolving the phenol-aldehyde condensation product, said products forming homogeneous brownish colored solutions of syrupy consistency, being easily soluble in water and alkalies, precipitating gelatine from its solution and giving characteristic colorations with ferric salts.

14. As new products the tanning substances obtainable by reacting a sodium p-benzylchloride sulfonate with an alkali-soluble cresol-aldehyde condensation product in the presence of water and an alkaline agent which is capable of dissolving the cresol-aldehyde condensation product, said products forming homogeneous brownish colored solutions of syrupy consistency, being easily soluble in water and alkalies, precipitating gelatine from its solution and giving characteristic colorations wi h ferric salts.

15. Process of preparing tanning substances which comprises reacting an organic compound containing the atom grouping

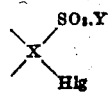

wherein Hlg stands for a replaceable halogen, Y for hydrogen or a salt-forming residue and X for a chain of two or more carbon atoms, with an alkali-soluble cresol-acetaldehyde condensation product in the presence of water and an alkaline agent which is capable of dissolving the cresol-acetaldehyde condensation product.

16. Process of preparing tanning substances which comprises reacting a sodium benzylchloride sulfonate with an alkali-soluble cresol-acetaldehyde condensation product in the presence of water and an alkaline agent which is capable of dissolving the cresol-acetaldehyde condensation product.

17. Process of preparing tanning substances which comprises reacting a sodium para-benzylchloride sulfonate with an alkali-soluble cresol-acetaldehyde condensation product in the presence of water and an alkaline agent which is capable of dissolving the cresol-acetaldehyde condensation product.

18. As new products, the tanning substances obtainable by reacting an organic compound containing the atom grouping

wherein Hlg stands for a replaceable halogen, Y for hydrogen or a salt forming residue and X for a chain of two or more carbon atoms, with an alkali-soluble cresol-acetaldehyde condensation product in the presence of water and an alkaline agent which is capable of dissolving the cresol-acetaldehyde condensation product, said products forming homogeneous brownish colored solutions of syrupy consistency, being easily soluble in water and alkalies, precipitating gelatine from its solution and giving characteristic colorations with ferric salts.

19. As new products, the tanning substances obtainable by reacting a sodium benzylchloride sulfonate with an alkali-soluble cresol-acetaldehyde condensation product in the presence of water and an alkaline agent which is capable of dissolving the cresol-actealdehyde condensation product, said products forming homogeneous brownish colored solutions of syrupy consistency, being easily soluble in water and alkalies precipitating gelatine from its solution and giving characteristic colorations with ferric salts.

20. As new products, the tanning substances obtainable by reacting a sodium para-benzylchloride sulfonate with an alkali-soluble cresol-acetaldehyde condensation product in the presence of water and an alkaline agent which is capable of dissolving the cresol-acetaldehyde condensation product, said products forming homogeneous brownish colored solutions of syrupy consistency, being easily soluble in water and alkalies, precipitating gelatine from its solution and giving characteristic colorations with ferric salts.

In testimony whereof, we affix our signatures.

GEORG KRÄNZLEIN.
ARTHUR VOSS.

Certificate of Correction

Patent No. 1,825,802. Granted October 6, 1931, to

GEORG KRÄNZLEIN ET AL.

It is hereby certified that error appears in the printed specification of the above-numbered patent requiring correction as follows: Page 2, line 43, for the syllable " toly-" read *tolyl-;* page 3, line 43, for the incomplete word " hea ed " read *heated*, and line 64, for " 140° " read *140° C.;* page 6, lines 37 to 40, claim 1, strike out the formula and insert instead

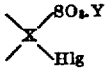

page 7, line 117, claim 14, for " wi h " read *with;* page 8, line 43, for the misspelled word " actealdehyde " read *acetaldehyde;* and that the said Letters Patent should be read with these corrections therein that the same may conform to the record of the case in the Patent Office.

Signed and sealed this 16th day of February, A. D. 1932.

[SEAL.]

M. J. MOORE,
*Acting Commissioner of Patents.*